(12) United States Patent
Rezaiifar et al.

(10) Patent No.: US 8,150,408 B2
(45) Date of Patent: *Apr. 3, 2012

(54) PILOT GROUPING AND SET MANAGEMENT IN MULTI-CARRIER COMMUNICATION SYSTEMS

(75) Inventors: Ramin Rezaiifar, San Diego, CA (US); Parag Arun Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/156,202

(22) Filed: Jun. 17, 2005

(65) Prior Publication Data
US 2006/0205415 A1    Sep. 14, 2006

Related U.S. Application Data

(60) Provisional application No. 60/659,856, filed on Mar. 8, 2005.

(51) Int. Cl.
H04Q 7/20    (2006.01)
(52) U.S. Cl. ............ 455/452.2; 455/452.1; 455/450
(58) Field of Classification Search ......... 455/452.1, 455/452.2, 450
See application file for complete search history.

(56) References Cited

U.S. PATENT DOCUMENTS

| 5,867,478 | A  * | 2/1999  | Baum et al. ............ 370/203 |
| 6,151,508 | A    | 11/2000 | Kim et al. |
| 6,172,993 | B1   | 1/2001  | Kim et al. |
| 6,205,132 | B1 * | 3/2001  | Hong et al. ............ 370/342 |
| 6,430,414 | B1   | 8/2002  | Sorokine et al. |
| 6,697,629 | B1   | 2/2004  | Grilli et al. |
| 7,339,999 | B2   | 3/2008  | Gore et al. |
| 7,630,719 | B2   | 12/2009 | Bender et al. |
| 2002/0025001 | A1 | 2/2002 | Ismaeil et al. |
| 2003/0035393 | A1 * | 2/2003 | Sinnarajah et al. ...... 370/335 |
| 2003/0174643 | A1 | 9/2003 | Ro et al. |
| 2004/0160919 | A1 | 8/2004 | Balachandran et al. |
| 2004/0166887 | A1 | 8/2004 | Laroia et al. |

(Continued)

FOREIGN PATENT DOCUMENTS

AU    2006220538    9/2006

(Continued)

OTHER PUBLICATIONS

3G Wireless2000, 2000, J Luo et al., Optimal Timer Settings for the Soft Handover Algorithm in WCDMA, pp. 1-8.

(Continued)

Primary Examiner — Charles Shedrick
(74) Attorney, Agent, or Firm — D. Scott Juneau

(57) ABSTRACT

Embodiments disclosed herein relate to methods and systems for grouping pilot signals and using such grouping for pilot strength reporting and set management in multi-carrier communication systems. In one embodiment, an access network may assign a group identifier (or "group ID") to each of the pilot signals associated with the sector, e.g., based on the coverage areas of the pilot signals, and transmit the pilot signals with the corresponding group IDs. PN offset may be used as the group ID. An access terminal may group the pilot signals received into one or more pilot groups in accordance with their group IDs, and select a representative pilot signals from each pilot group for pilot strength reporting. The access terminal may also use the pilot grouping to perform effective set management.

30 Claims, 11 Drawing Sheets

U.S. PATENT DOCUMENTS

| | | |
|---|---|---|
| 2004/0203420 A1 | 10/2004 | Rick et al. |
| 2005/0009528 A1 | 1/2005 | Iwamura et al. |
| 2005/0159185 A1 | 7/2005 | Hiramatsu |
| 2007/0066232 A1 | 3/2007 | Black |

FOREIGN PATENT DOCUMENTS

| | | |
|---|---|---|
| CN | 1327694 | 12/2001 |
| EP | 1 081 876 | 3/2001 |
| EP | 1 146 761 | 10/2001 |
| EP | 1489787 A1 | 12/2004 |
| JP | 8125663 | 5/1996 |
| JP | 09294287 A * | 11/1997 |
| JP | 2001119745 | 4/2001 |
| JP | 2002111740 A2 | 4/2002 |
| JP | 2002525999 | 8/2002 |
| JP | 2003289575 A | 10/2003 |
| JP | 2004523934 | 8/2004 |
| RU | 2176854 | 12/2001 |
| RU | 2210864 | 8/2003 |
| WO | WO9901956 A1 | 1/1999 |
| WO | WO0018172 | 3/2000 |
| WO | WO0076085 | 12/2000 |
| WO | WO0231991 A2 | 4/2002 |
| WO | WO02087139 A1 | 10/2002 |
| WO | WO02102132 A2 | 12/2002 |
| WO | 03056869 | 7/2003 |
| WO | WO03096657 A2 | 11/2003 |
| WO | WO2004071042 A1 * | 8/2004 |
| WO | WO2005013509 A1 | 2/2005 |

OTHER PUBLICATIONS

Daniel Wong, et al., "Soft Handoffs in CDMA Mobile Systems", IEEE Personal Communications, Dec. 1997, pp. 6-17.

European Search Report—EP10163287, Search Authority—Munich Patent Office, Jul. 8, 2010 (050521).

Lee, H-S. et al. "Cell search scheme using I/Q multiplexed code assignment in asynchronous W-CDMA system," Vehicular Technology Conference, 1999 IEEE 49th, vol. 2, May 16-20, 1999, Houston, TX, pp. 1560-1564.

International Search Report—PCT/US2006/008222, International Search Authority—European Patent Office—Sep. 4, 2006.

International Preliminary Report on Patentability—PCT/US2006/008222, International Search Authority—The International Bureau of WIPO, Geneva, Switzerland—Sep. 12, 2007.

Written Opinion—PCT/US2006/008222, International Search Authority—European Patent Office—Sep. 4, 2006.

Translation of Office Action in Japanese application 2008-532453 corresponding to U.S. Appl. No. 11/523,959, citing JP2002525999, JP2001119745, US20040203420, JP2004523934, JP2003289575 and WO2006096764 dated Feb. 1, 2011.

* cited by examiner

FIG.4a

Active Set (410)

| PN offset | Frequency |
|---|---|
| x | $f_1$ |
| x | $f_2$ |
| y | $f_1$ |
| y | $f_2$ |

Candidate Set (420)

| PN offset | Frequency |
|---|---|
| z | $f_2$ |

FIG.4b

Active Set (410)

| PN offset | Frequency |
|---|---|
| x | $f_1$ |
| x | $f_2$ |
| y | $f_1$ |
| y | $f_2$ |
| z | $f_1$ |

Candidate Set (420)

| PN offset | Frequency |
|---|---|
|  |  |

FIG.4c

Active Set (410)

| PN offset | Frequency |
|---|---|
| x | $f_1$ |
| y | $f_1$ |
| y | $f_2$ |

Candidate Set (420)

| PN offset | Frequency |
|---|---|
| z | $f_2$ |

PILOT GROUPING AND SET MANAGEMENT IN MULTI-CARRIER COMMUNICATION SYSTEMS

CLAIM OF PRIORITY UNDER 35 U.S.C. §119

This application for patent claims priority to Provisional Patent Application No. 60/659,856, entitled "Pilot Strength Reporting and Active/Candidate/Neighbor Set Management or Multi-carrier systems", filed on Mar. 8, 2005, which is assigned to the Assignee hereof and hereby expressly incorporated by reference herein.

BACKGROUND

1. Field

This disclosure relates generally to wireless communications. More specifically, embodiments disclosed herein relate to pilot grouping and reporting, and set management in multi-carrier communication systems.

2. Background

Wireless communication systems are widely deployed to provide various types of communication (e.g., voice, data, etc.) to multiple users. Such systems may be based on code division multiple access (CDMA), time division multiple access (TDMA), frequency division multiple access (FDMA), or other multiple access techniques. CDMA systems offer some desirable features, including increased system capacity. A CDMA system may be designed to implement one or more standards, such as IS-95, cdma2000, IS-856, W-CDMA, TD-SCDMA, and other standards.

In response to the growing demand for multimedia services and high-rate data, multi-carrier modulation has been proposed in wireless communication systems. There lies a challenge to provide efficient and robust multi-carrier communication systems.

BRIEF DESCRIPTION OF THE DRAWINGS

FIGS. 4a-4c show an embodiment of set management in a multi-carrier communication system;

DETAILED DESCRIPTION

Embodiments disclosed herein relate to methods and systems for grouping pilot signals and using such grouping for pilot strength reporting and set management in multi-carrier communication systems.

Figure 1:
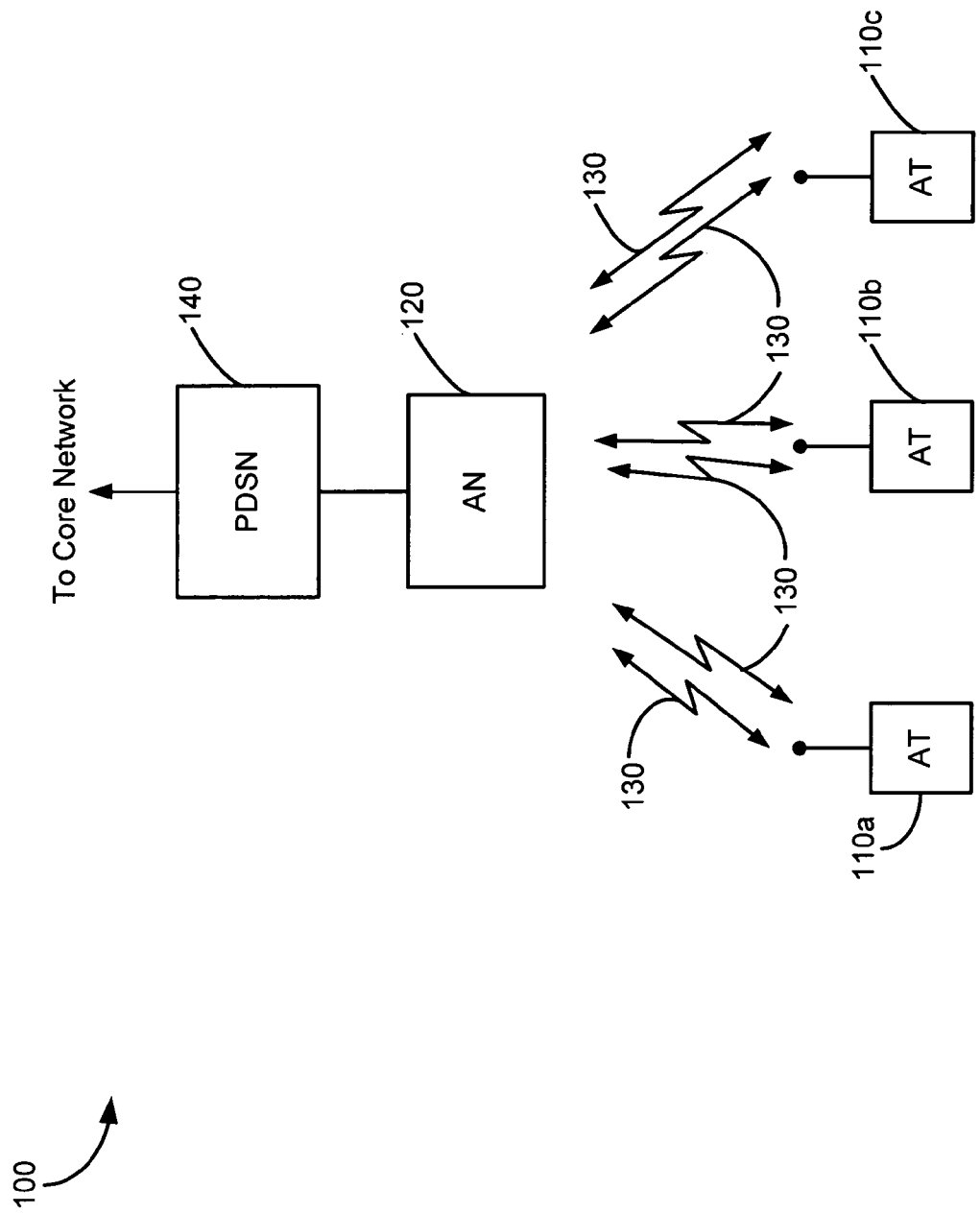
FIG. 1 shows an embodiment of a multi-carrier communication system.

FIG. 1 illustrates an embodiment of a multi-carrier communication system 100. By way of example, various access terminals (ATs) 110, including ATs 110a-110c, are dispersed throughout the system. Each AT 110 may communicate with an access network (AN) 120 via one or more channels at different frequencies on a forward link and/or a reverse link at a given moment, as illustrated by double-sided arrows 130. For illustration and clarity, two double-sided arrows 130 are shown for each AT 110. There may be any number of channels (or frequencies) on either forward link or reverse link in a communication system. Further, the number of frequencies on the forward link (or "forward link frequencies") need not be the same as the number of frequencies on reverse link (or "reverse link frequencies").

AN 120 may further be in communication with a core network, such as a packet data network via a packet data serving node (PDSN) 140. In one embodiment, system 100 may be configured to support one or more standards, e.g., IS-95, cdma2000, IS-856, W-CDMA, TD-SCDMA, other multi-carrier standards, or a combination thereof.

As described herein, an AN may refer to the portion of a communication system configured to interface with a core network (e.g., a packet data network via PDSN 140 in FIG. 1) and route data between ATs and the core network, perform various radio access and link maintenance functions, control radio transmitters and receivers, and so on. An AN may include and/or implement the functions of a base station controller (BSC) (such as found in a $2^{nd}$ or $3^{rd}$ generation wireless network), a base-station transceiver system (BTS), an access point (AP), a modem pool transceiver (MPT), a Node B (e.g., in a W-CDMA type system), etc.

An AT described herein may refer to various types of devices, including (but not limited to) a wired phone, a wireless phone, a cellular phone, a laptop computer, a wireless communication personal computer (PC) card, a personal digital assistant (PDA), an external or internal modem, etc. An AT may be any data device that communicates through a wireless channel or through a wired channel (e.g., by way of fiber optic or coaxial cables). An AT may have various names, such as access unit, subscriber unit, mobile station, mobile device, mobile unit, mobile phone, mobile, remote station, remote terminal, remote unit, user device, user equipment, handheld device, etc. Different ATs may be incorporated into a system. ATs may be mobile or stationary, and may be dispersed throughout a communication system. An AT may communicate with one or more ANs on a forward link and/or a reverse link at a given moment. The forward link (or downlink) refers to transmission from an AN to an AT. The reverse link (or uplink) refers to transmission from the AT to the AN.

A multi-carrier communication system described herein may include a frequency division multiplex system, an orthogonal frequency division multiplex system, or other multi-carrier modulation systems, where each carrier corresponds to a frequency range.

A pilot signal described herein may be characterized (or specified) by a pair of parameters and denoted as <PN offset, channel>, where "channel" refers to the frequency of the pilot signal, and "PN offset" is uniquely associated with the pilot signal. The term "channel" may be used herein interchangeably with the term "frequency." Further, a "coverage area" of a pilot signal may refer to a "strength vs. distance" profile of the pilot signal.

Figure 2:
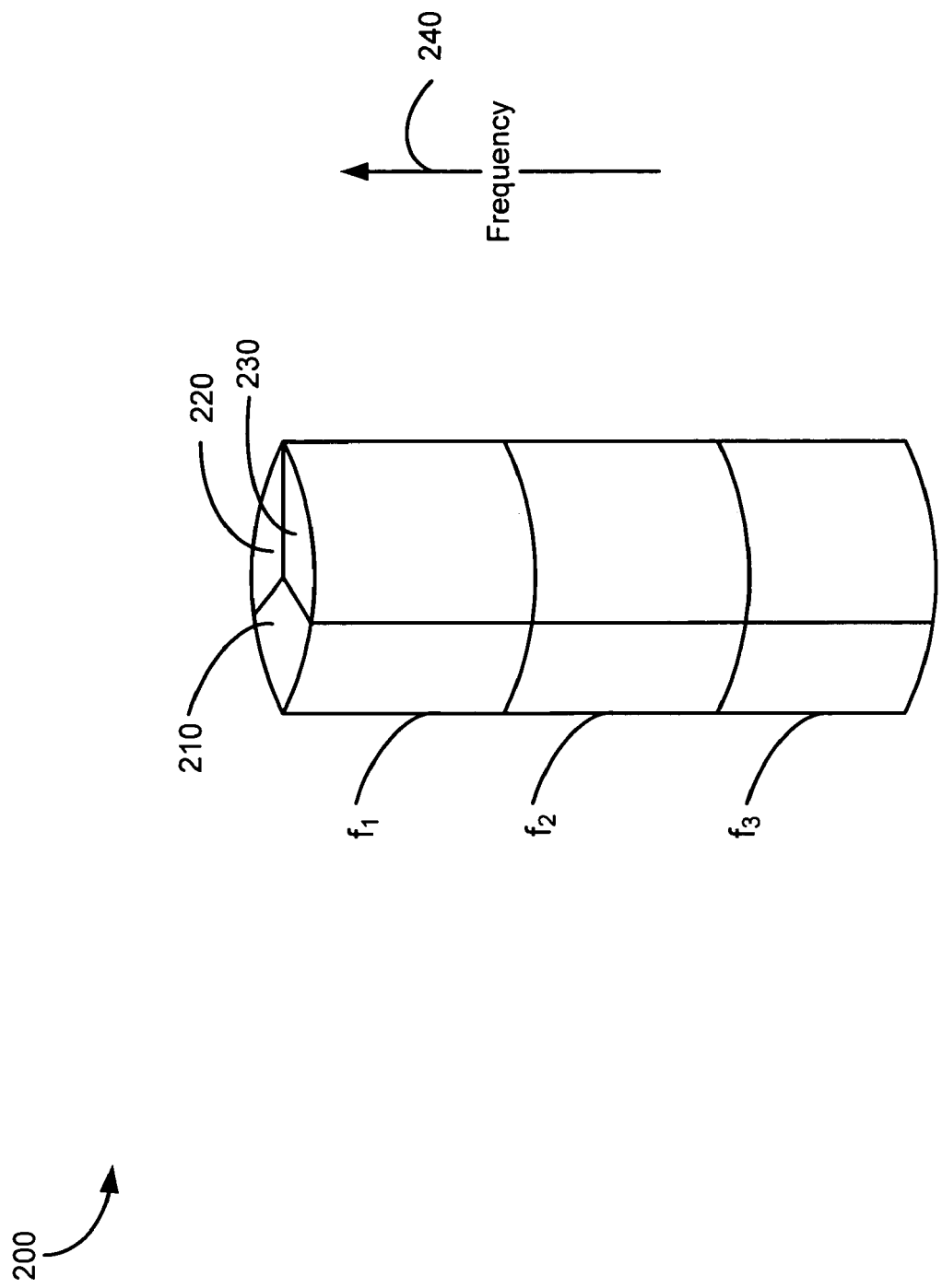
FIG. 2 shows an embodiment of a cell having multiple sectors in a multi-carrier communication system.

A cell may refer to a coverage area serviced by an AN. A cell may be divided into one or more sectors. One or more frequencies may be assigned to cover a cell. FIG. 2 shows an embodiment of a cell 200 in a multi-carrier communication system. By way of example, cell 200 is shown to be divided into three sectors 210, 220, 230. Three frequencies $f_1, f_2, f_3$ are assigned to cover cell 200. For illustration and clarity, cell 200 is shown as a cylinder, whose cross-section area is corresponds with cell 200's coverage area, and whose height along an axis 240 corresponds with the frequency dimension of cell 200. As such, each wedge of the cylinder (across all frequencies) constitutes a sector. In other embodiments, cells may have different shapes, and may have any number of sectors. There may also be any number of frequencies allocated to a cell. For example, in some situations, multiple frequencies may be allocated to a cell covering a large coverage area, such as shown in FIG. 2. In other situations, one frequency may be allocated to a cell covering a small dense area (e.g., a "hot spot").

In a single-carrier communication system, an AT is required to report the strengths of all the pilot signals received, as the pilot signals become strong or weak in strength. In a multi-carrier communication system, there may be multiple pilot signals associated with a sector, as shown in FIG. 2. If an AT were to report the strength of each pilot signal received (as in the single-carrier system), such would cause too many triggers for a pilot strength report (e.g., route update message in an IS-856 type system) because there are more pilots signals and each of which may cross the reporting thresholds independently due to short-term fading, and each report would be larger because there are more pilot signals to report. Further, many of these pilot signals may have comparable coverage areas and reporting one of them may provide sufficient information to the access network with regard to the set of pilot signals an AT is receiving. A need therefore exists for an efficient way of managing pilot signals in multi-carrier communication system.

Embodiments disclosed herein relate to methods and systems for grouping pilot signals and using such grouping for pilot strength reporting and set management in multi-carrier communication systems.

In one embodiment, an AN serving a sector may assign a group identifier (or "group ID") to each of the pilot signals associated with the sector, e.g., based on the coverage areas of the pilot signals, such that the pilot signals having comparable coverage areas share a common group ID. PN offset may be used as the group ID in one embodiment. The AN then transmits the pilot signals with the corresponding group IDs. An AT may group the pilot signals received into one or more pilot groups in accordance with their group IDs. The AT may further select one pilot signal from each pilot group as the representative pilot signal for pilot strength reporting. The AT may also use the pilot grouping to perform effective set management, as further described below.

Figure 3:
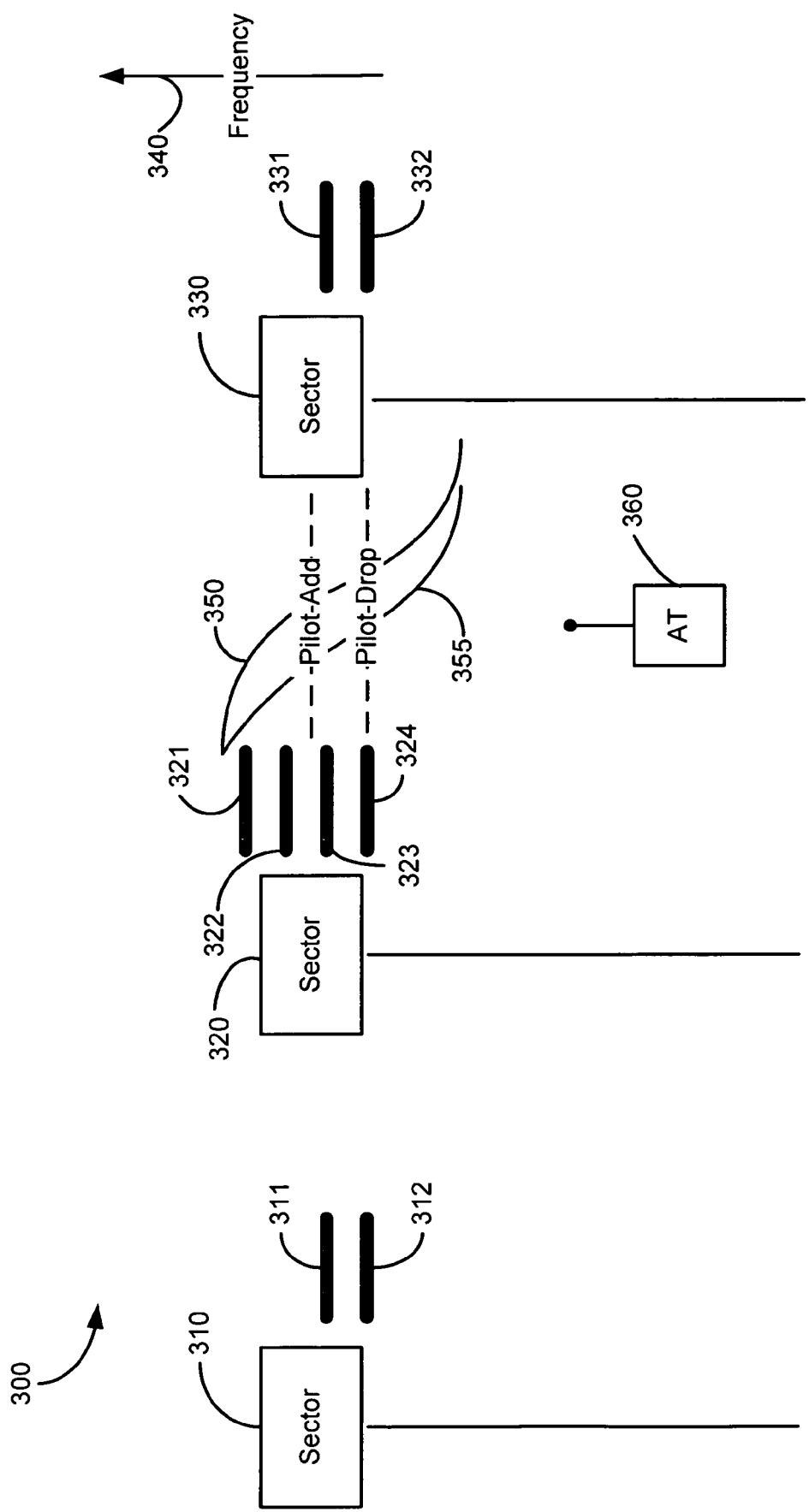
FIG. 3 shows an embodiment of several sectors and associated pilot signals in a multi-carrier communication system.

FIG. 3 shows an embodiment of several sectors and associated pilot signals in a multi-carrier communication system 300. System 300 may generally include any number of sectors, each associated with one or more pilot signals having distinct frequencies. For illustration and clarity, three sectors 310, 320, 330 are explicitly shown. Also shown by way of example are pilot signals 311, 312 associated with sector 310, pilot signals 321-324 associated with sector 320, and pilot signals 331, 332 associated with sector 330. These pilot signals are shown in reference to a frequency axis 340, indicating that pilot signals associated with a given sector have different frequencies.

FIG. 3 further shows a strength vs. distance profile 350 presenting the coverage area of pilot signal 321 or 322, and a strength vs. distance profile 355 presenting the coverage area of pilot signal 323 or 324.

In one embodiment, an AN (not explicitly shown) serving sector 320 may assign a group ID to each of pilot signals 321-324 based on their coverage areas, such that the pilot signals having the substantially same coverage area share a common group ID. PN offset may be used as the group ID in one embodiment. For example, pilot signals 321, 322 may share a common group ID (or PN offset); pilot signals 323, 324 may also share a common group ID (or PN offset). The AN may then transmit pilot signals 321-324 with the corresponding group IDs. Upon receiving pilot signals 321-324, an AT 360 may group pilot signals 321, 322 into a first pilot group and pilot signals 323, 324 into a second pilot group in accordance with their group IDs. AT 360 may select one pilot signal from each pilot group as a representative pilot signal for the group: e.g., pilot signal 321 may be selected as the representative pilot signal for the first pilot group, and pilot signal 324 may be selected as the representative pilot signal for the second pilot group. AT 360 may measure the strength of each received pilot signal, or at least one pilot signal from each pilot group (such as the representative pilot signal). AT 360 may include only the representative pilot signal (as opposed to the entire pilot group) in a pilot strength report, as further described below.

In the embodiment of FIG. 3, two pilot strength thresholds, "pilot-add" and "pilot-drop", are marked on profiles 350, 355. These thresholds may be used to determine to which one of AT 360's candidate set and neighbor set each received pilot signal belong. For example, if the strength of a pilot signal received by AT 360 exceeds the pilot-add threshold, the pilot signal may potentially be added to AT 360's candidate set, as further described below. If the strength of a pilot signal received by AT 360 falls below the pilot-drop threshold, the pilot signal may be removed from AT 360's active set or candidate set.

In one embodiment, as AT 360 moves away from sector 320, it may first detect that the strengths of pilot signals 323, 324 in the second pilot group fall below the pilot-drop threshold, and later those of pilot signals 321, 322 in the first pilot group. (Such may be due to that pilot signals 321, 322 do not counterparts in neighboring sectors 310, 330, hence being subject to less interference.) As a result, AT 360 may first send a pilot strength report for the representative pilot signal associated with the second pilot group and later a pilot strength report for the representative pilot associated with the first pilot group to the AN, in connection with these two events. The pilot strength report may include, e.g., the strength, the PN offset, and the frequency of the corresponding representative pilot signal. In another embodiment, as AT 360 moves closer to sector 320, AT 360 may first send a pilot strength report for the representative pilot signal associated with the first pilot group and later a pilot strength report for the representative pilot associated with the second pilot group to the AN (in connection with the sequential rise of the strengths of the pilot signals in these two groups).

Further, pilot signals in sectors 310, 330 may also be grouped in a similar manner. For example, pilot signals 311, 312 in sector 310 may form a pilot group. Pilot signals 331, 332 in sector 330 may also form a pilot group. In one embodiment, sector 320 (or the AN servicing it) may select one pilot signal from each pilot group in neighbor sectors 310, 330, e.g., pilot signal 311 and pilot signal 332, and advertise only the selected pilot signals from its neighbor sectors.

The pilot grouping and reporting thus described allows ATs to communicate effectively with an AN in a multi-carrier communication system, while avoiding excessive use of network resources. It further allows an AT to perform set management effectively, as further described below.

FIGS. 4a-4c show an embodiment of set management in a multi-carrier communication system. For clarity and illustration, each pilot signal is specified by <PN offset, frequency>, where the PN offset also serves as the group ID for each pilot signal. By way of example, FIG. 4a shows that an AT (not explicitly shown) may initially have an active set 410 including a first pilot group having a group ID "x" and a second pilot group having a group ID being "y". The first pilot group includes two pilot signals specified by <x, $f_1$> and <x, $f_2$>, and the second pilot group includes two pilot signals specified by <y, $f_1$> and <y, $f_2$>. The AT may also have a candidate set 420 initially including a third pilot group having a group ID "z". The third pilot group has one pilot signal specified by <z, $f_2$>. Each pilot signal in either active set 410 or candidate set 420 has the strength above a predetermined threshold (e.g., the pilot-add threshold described above in FIG. 3).

FIG. 4b shows that in one instance, a pilot signal specified by <z, $f_1$> is added to active set 410. As a result, pilot signal <z, $f_2$> is removed from candidate set 420, because both would belong to the same pilot group.

FIG. 4c shows that in another instance, pilot signal specified by <x, $f_2$> is removed from active set 410 and is not added to candidate set 420. This is because there remains another pilot signal <x, $f_1$> belonging to the first pilot group in active set 410.

In general, an AT may be served by any of the pilot signals in its active set. Each pilot group in its active set may include one or more pilot signals. The pilot signals in its candidate set may have distinct group IDs; and no pilot signal in its candidate set may have the same group ID as any pilot signal in its active set or any other any other sets. Such may also imply that in the event that the AT receives a pilot signal with the strength above the pilot-add threshold and has the same group ID as an existing pilot signal in its candidate set, it may not add the pilot signal to its candidate set. The description with regard to the candidate set also applies to the neighbor set associated with the AT, as further described below.

In one embodiment, an AT may manage its candidate set as follows. The AT may maintain the candidate such that the pilot signals in the candidate set all have distinct group IDs (in other words, each pilot group has only one pilot signal). The AT may add a pilot signal to the candidate set in such events: a) if the strength of a pilot signal exceeds the pilot-add threshold and the pilot signal does not have the same group ID as any one of the existing pilot signals in the active set or the candidate set, the AT may add any pilot signal with the same group ID (as the pilot signal whose strength exceeds the pilot-add threshold) to the candidate set; b) if a pilot signal is removed from the active set and the active set does not have any pilot signal with the same group ID (as the removed pilot signal) and the pilot signal's drop timer has not expired, the AT may add any pilot signal with the same group ID (as the removed pilot signal) to the candidate set.

In one embodiment, an AT may manage its neighbor set as follows. The AT maintains the neighbor set such that the pilot signals in the neighbor set all have distinct group IDs (in other words, each pilot group has only one pilot signal). The AT may add or remove a pilot signal to the neighbor set in such events: a) if a pilot signal having a group ID is added to the active set or the candidate set, then any pilot signal with the same group ID as the added pilot signal in the neighbor set may be removed; b) if a pilot signal having a group ID is removed from the active set, but not added to the candidate set, and the active set does not have any pilot signal with the same group ID as the removed pilot signal, the AT may add any pilot signal with the same group ID (as the removed pilot signal) to the neighbor set; c) if a pilot signal having a group ID is removed from the candidate set, but not added to the active set, and the active set does not have any pilot signal with the same group ID as the removed pilot signal, the AT may add any pilot signal with the same group ID (as the removed pilot signal) to the neighbor set.

The pilot grouping disclosed herein allows efficient set management in a multi-carrier system. There may be other embodiments of set management.

Figure 5:
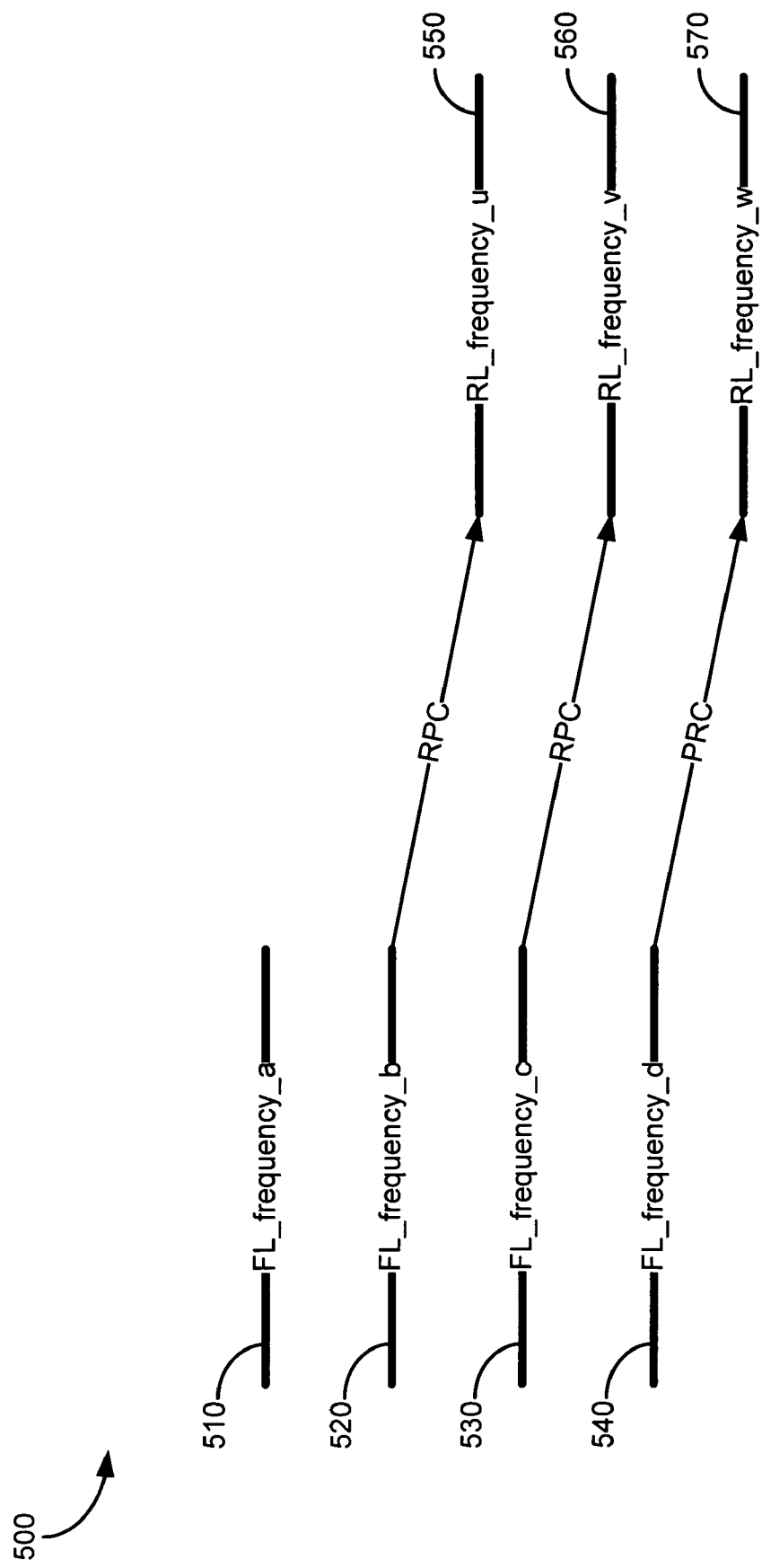
FIG. 5 shows an embodiment of traffic channel assignment in a multi-carrier communication system.

FIG. 5 shows an embodiment of traffic channel assignment in a multi-carrier communication system. By way of example, multiple forward link (FL) channels, including FL channel 510 at FL_frequency_a, FL channel 520 at FL_frequency_b, FL channel 530 at FL_frequency_c, and FL channel 540 at FL_frequency_d, are to be transmitted from an AN to an AT (both not explicitly shown). Reverse link (RL) channels, including RL channel 550 at RL_frequency_u, RL channel 560 at FL_frequency_v, and RL channel 570 FL_frequency_w, are assigned to the AT. In one embodiment, the AN may assign a plurality of the forward link channels each to carry a reverse power control (RPC) bit stream for each of the reverse link channels assigned to the AT. For example, FL channel 520 may be assigned to carry the RPC bit stream for RL channel 550, FL channel 530 may be assigned to carry the RPC bit stream for RL channel 560, and FL channel 540 may be assigned to carry the RPC bit stream for RL channel 570, as shown in FIG. 5. Note, in this assignment, each pair of FL and RL channels need not have the same frequency.

In the embodiment of FIG. 5, the AN may also select one of the FL channels, e.g., FL channel 520, as a "primary pilot signal," and inform the AT to monitor the control channel carried by the primary pilot signal (e.g., for supervision and other purposes). In this way, the AT may ignore other forward link channels insofar as monitoring the control channel is concerned.

Embodiments disclosed herein (such as described above in FIGS. 2-5) provide some embodiments of pilot signal grouping and reporting, set management, and traffic channel assignment in a multi-carrier communication system. There are other embodiments and implementations.

Figure 6:
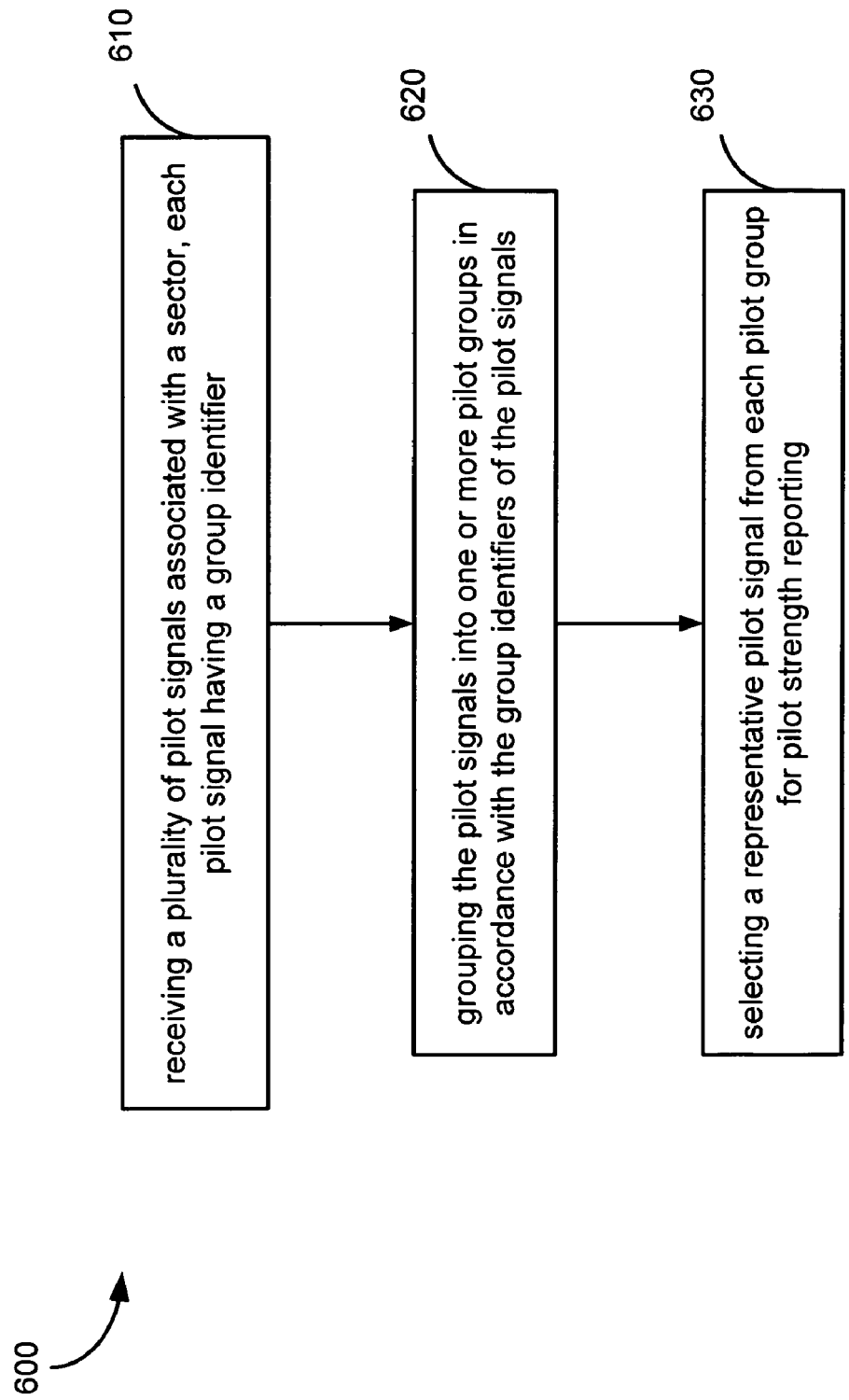
FIG. 6 shows a flow chart of a process, which may be used in one embodiment to implement pilot grouping and reporting in a multi-carrier communication system.

FIG. 6 shows a flow diagram of a process 600, which may be used in one embodiment to implement pilot signal grouping and reporting in a multi-carrier communication system. Step 610 receives a plurality of pilot signals associated with a sector, each pilot signal having a group identifier. Step 620 groups the pilot signals into one or more pilot groups in accordance with the group identifiers of the pilot signals. Step 630 selects a representative pilot signal from each pilot group for pilot strength reporting (such as described above). In one embodiment, PN offset may be used as the group identifier.

Figure 7:
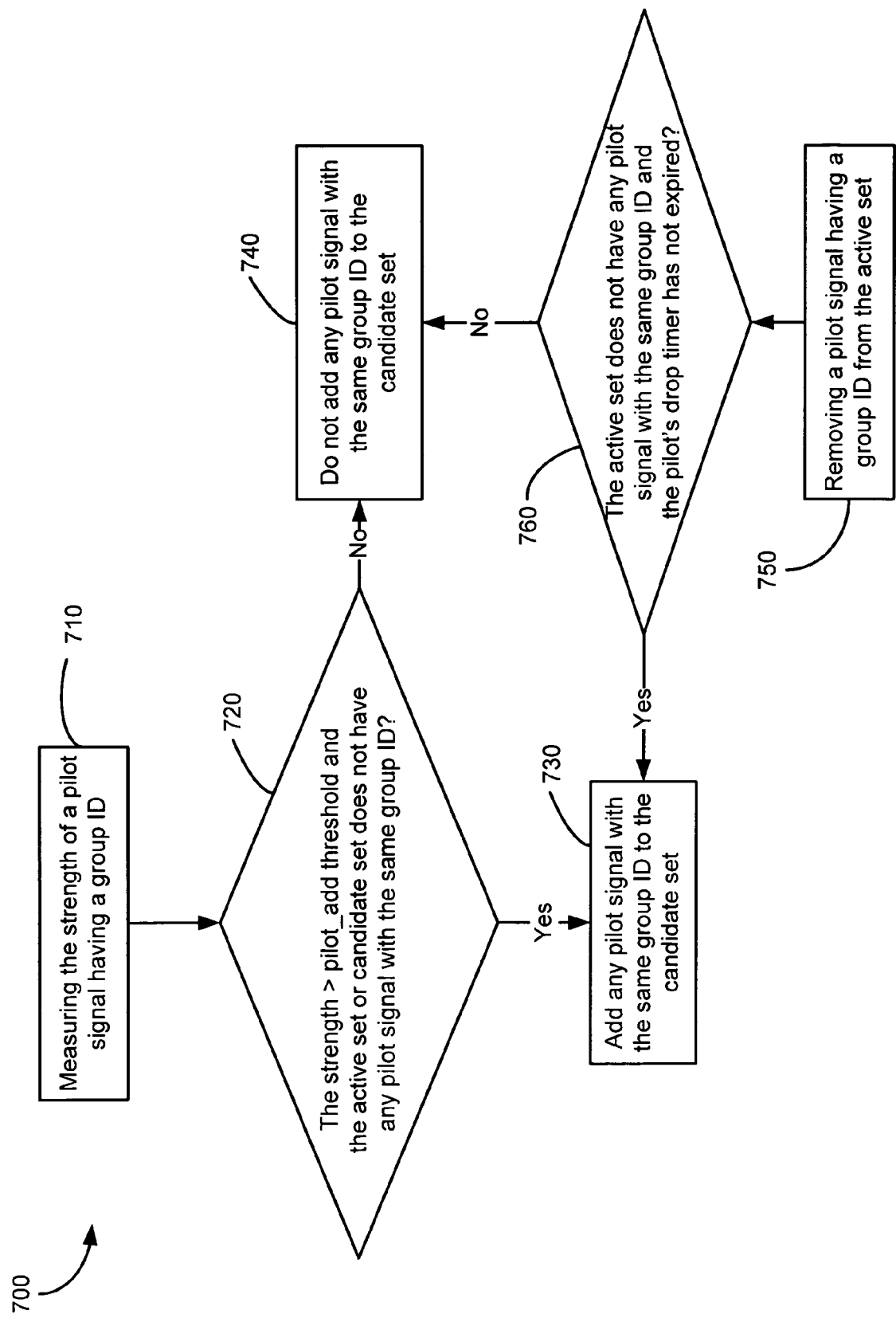
FIG. 7 shows a flow chart of a process, which may be used in one embodiment to implement set management in a multi-carrier communication system.

FIG. 7 shows a flow diagram of a process 700, which may be used in one embodiment to implement set management in a multi-carrier communication system. Step 710 measures the strength of a pilot signal having a group ID. Step 720 determines if the strength of the pilot signal exceeds the pilot-add threshold and the active set or candidate set does not have any pilot signal with the same group ID (as the pilot signal whose strength exceeds the pilot-add threshold). If the outcome of step 720 is "Yes", step 730 follows and adds any pilot signal with the same group ID (as the pilot signal whose strength exceeds the pilot-add threshold) to the candidate set.

If the outcome of step 720 is "No", no pilot signal with the same group ID (as the pilot signal whose strength exceeds the pilot-add threshold) is added to the candidate set, as shown in step 740. In the event that a pilot signal having a group ID is removed from the active set, as shown in step 750, step 760 determines if the active set does not have any pilot signal with the same group ID (as the removed pilot signal) and the pilot's drop timer has not expired. If the outcome of step 760 is "Yes", step 730 follows, as described above. If the outcome of step 760 is "No", step 740 follows, as described above.

Figure 8:
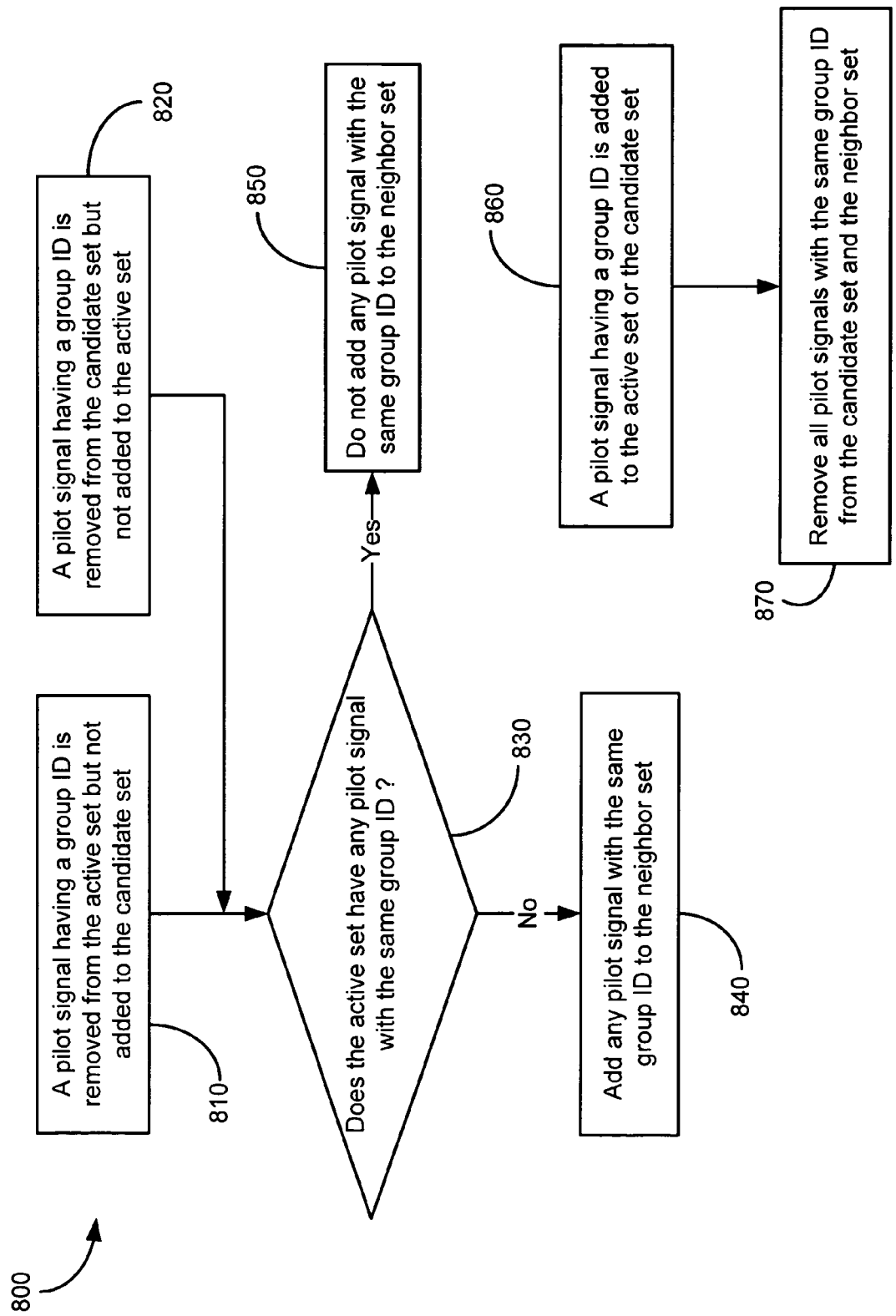
FIG. 8 shows a flow chart of a process, which may be used in another embodiment to implement set management in a multi-carrier communication system.

FIG. 8 shows a flow diagram of a process 800, which may be used in another embodiment to implement set management in a multi-carrier communication system. If a pilot signal having a group ID is removed from the active set but not added to the candidate set, as shown in step 810, or a pilot signal having a group ID is removed from the candidate set but not added to the active set, as shown in step 820, step 830 determines if the active set has any pilot signal with the same group ID (as the removed pilot signal). If the outcome of step 830 is "No", step 840 adds any pilot signal with the same group ID (as the removed pilot signal) to the neighbor set. If the outcome of step 830 is "Yes", no pilot signal with the same group ID (as the removed pilot signal) is added to the neighbor set, as shown in step 850.

In the event that a pilot signal having a group ID is added to the active set or candidate set, as shown in step 860, step 870 removes all the pilot signals with the same group ID (as the added pilot signal) from the candidate set and neighbor set.

Figure 9:
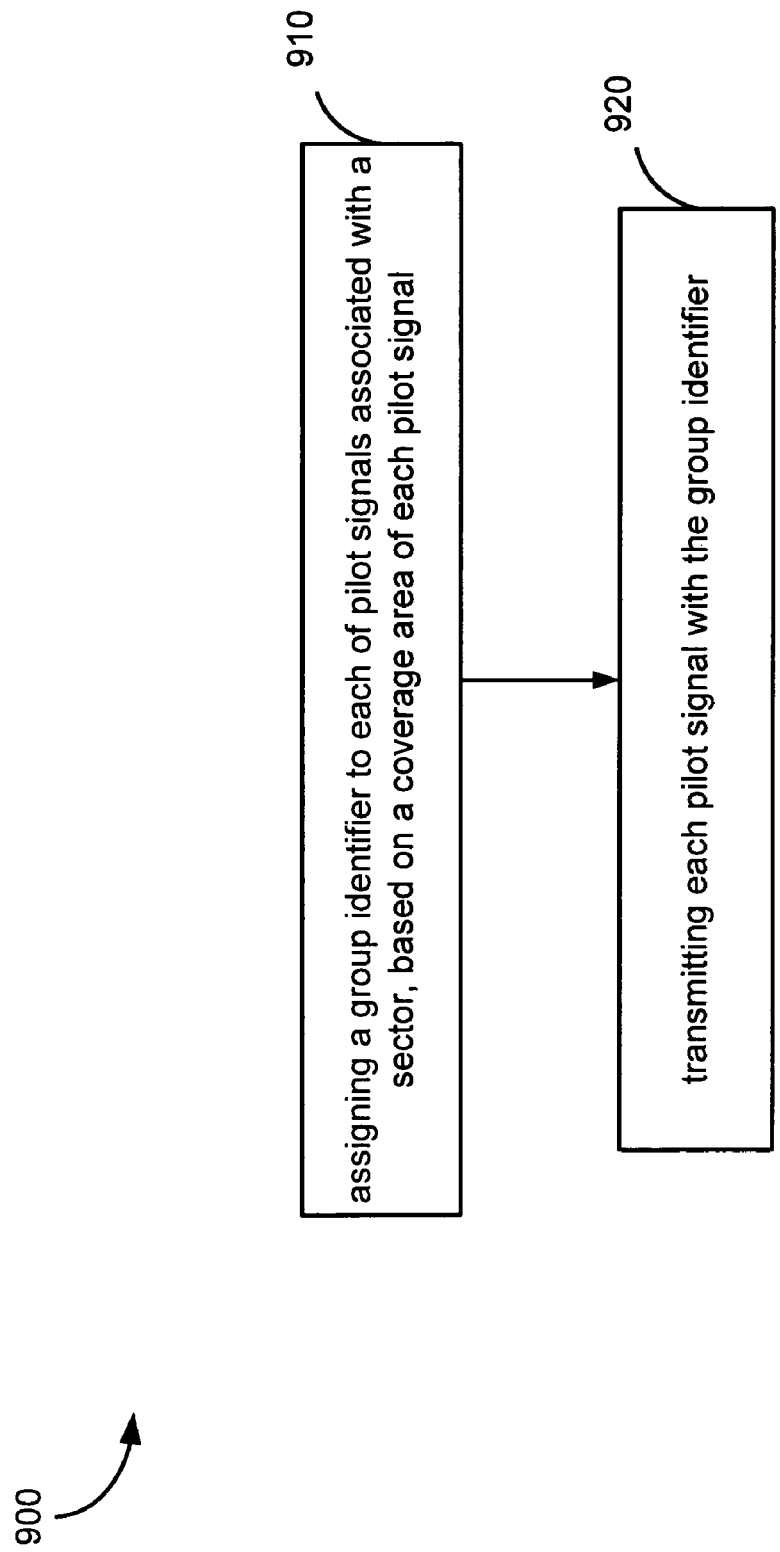
FIG. 9 shows a flow chart of a process, which may be used in an embodiment to implement pilot grouping in a multi-carrier communication system.

FIG. 9 shows a flow diagram of a process 900, which may be used in another embodiment to implement pilot grouping in a multi-carrier communication system. Step 910 assigns a group ID to each of pilot signals associated with a sector, based on a coverage area of each pilot signal. Step 920 transmits each pilot signal with the corresponding group ID.

Figure 10:
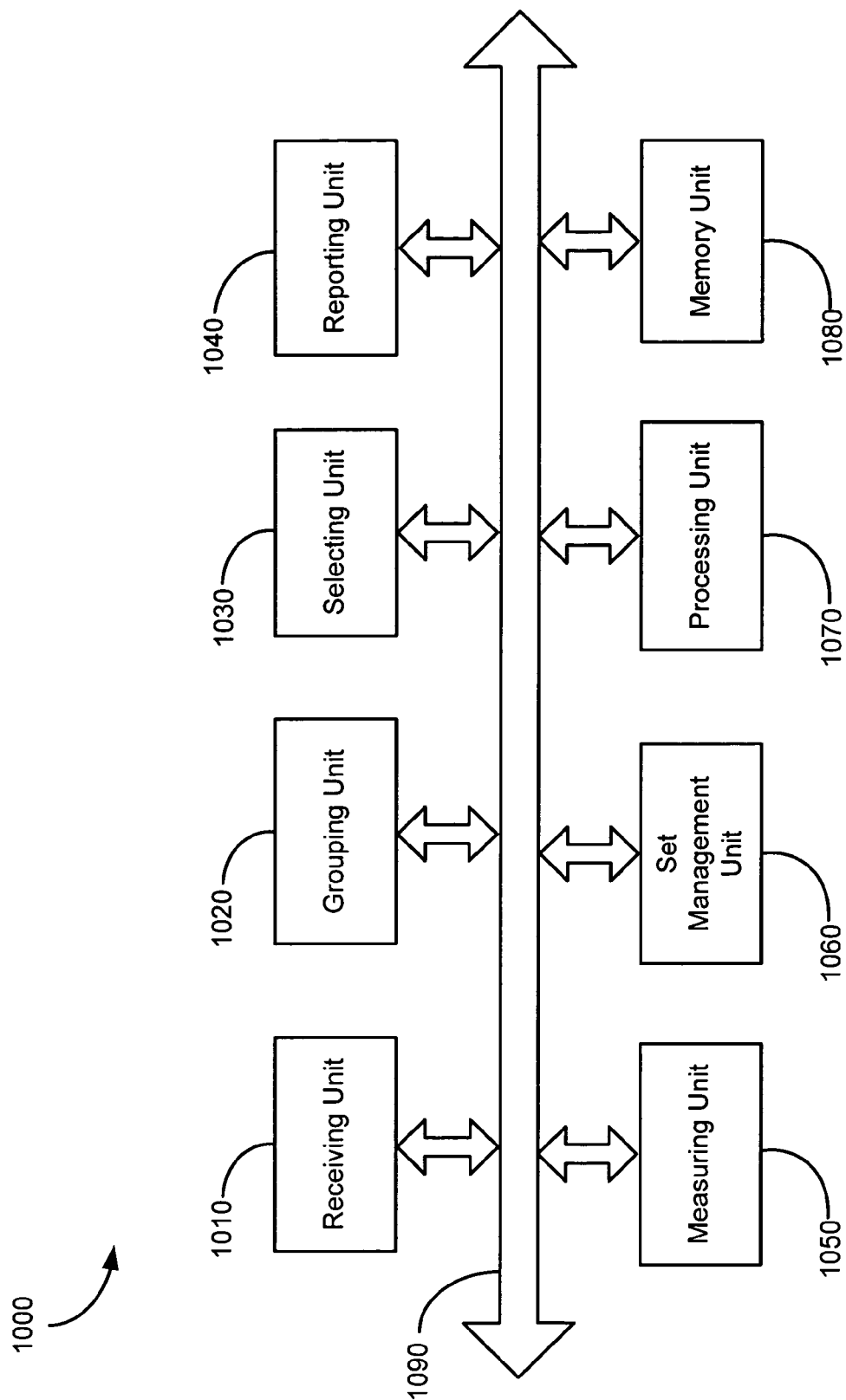
FIG. 10 shows a block diagram of an apparatus, in which some disclosed embodiments may be implemented.

FIG. 10 shows a block diagram of an apparatus 1000, which may be used to implement some disclosed embodiments (such as described above). By way of example, apparatus 1000 may include a receiving unit (or module) 1010 configured to receive a plurality of pilot signals associated with a sector, each pilot signal having a group ID; a grouping unit 1020 configured to group the pilot signals into one or more pilot groups in accordance with the group IDs of the pilot signals; and a selecting unit 1030 configured to select a representative pilot signal from each pilot group for pilot strength reporting. Apparatus 1000 may further includes a measuring unit 1050 configured to measure the strengths of the pilot signals (e.g., the strength of one pilot signal, such as the representative pilot signal, associated with each pilot group), and a reporting unit 1040 configured to configured to report the strength of the representative pilot signal for a pilot group to an access network (e.g., as the strengths of the pilot signals in the pilot group exceed the pilot-add threshold, or fall below the pilot-drop threshold, such as described above). Apparatus 1000 may also include a set-management unit 1060 configured to determine whether a received pilot signal belongs to one of the candidate set and the neighbor set associated with an AT (such as described above).

In apparatus 1000, receiving unit 1010, grouping unit 1020, selecting unit 1030, measuring unit 1050, reporting unit 1040, and set-management unit 1060 may be coupled to a communication bus 1090. A processing unit 1070 and a memory unit 1080 may also be coupled to communication bus 1090. Processing unit 1070 may be configured to control and/or coordinate the operations of various units. Memory unit 1080 may embody instructions to be executed by processing unit 1070. In some embodiments, memory unit 1080 may also store an AT's active set, candidate set, and neighbor set (such as described above).

Figure 11:
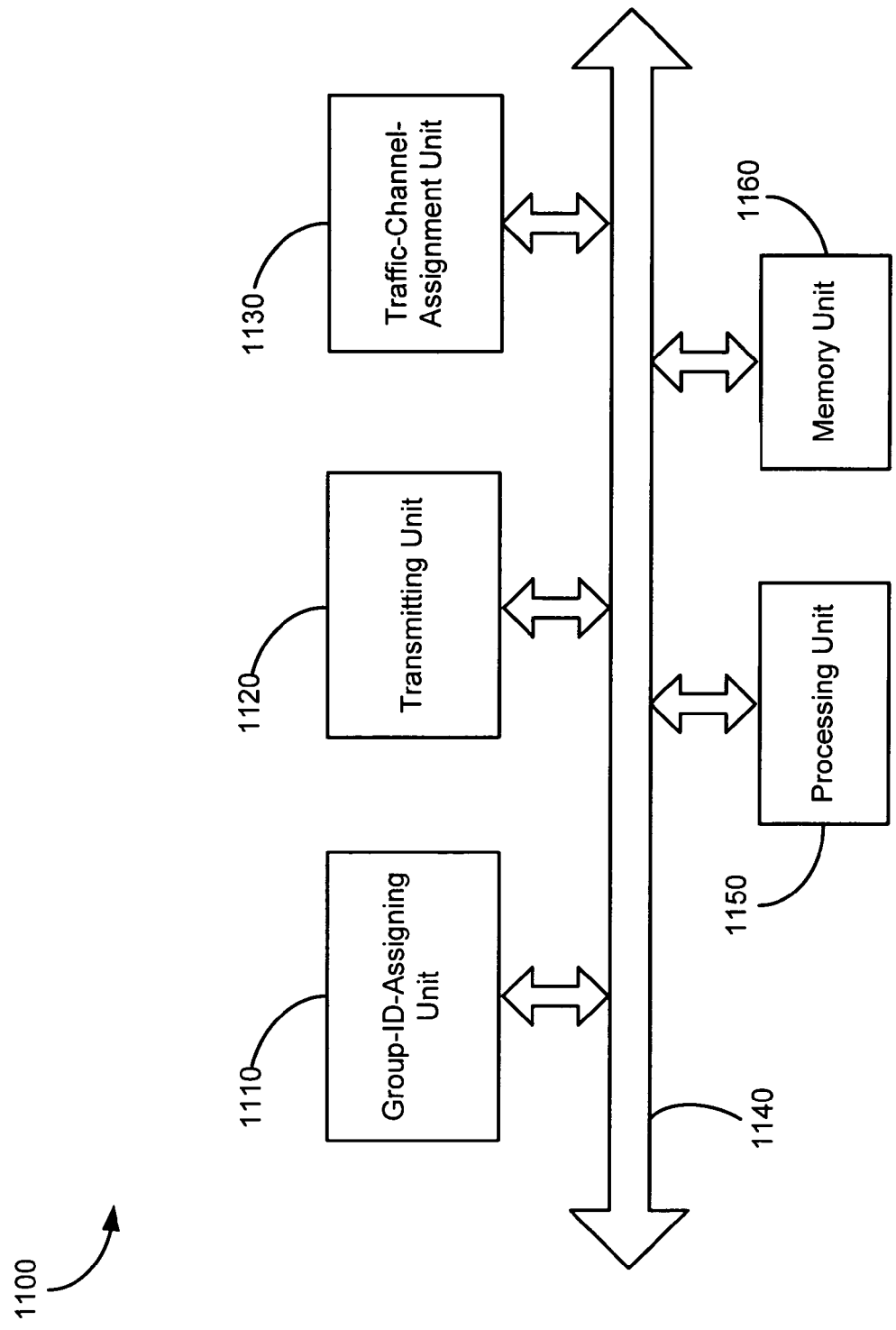
FIG. 11 shows a block diagram of an apparatus, in which some disclosed embodiments may be implemented.

FIG. 11 shows a block diagram of an apparatus 1100, which may be used to implement some disclosed embodiments (such as described above). By way of example, apparatus 1100 may include a group-ID-assigning unit 1110 configured to assigns a group ID to each of pilot signals associated with a sector, based on a coverage area of each pilot signal; and a transmitting unit 1120 configured to transmit the pilot signals with the corresponding group IDs. Apparatus 1100 may also include a traffic-channel assignment unit 1130 configured to assign one or more forward link channels to carry information (e.g., control channel, RPC bit stream, etc.) for an AT (such as described above in FIG. 5).

In apparatus 1100, group-ID-assigning unit 1110, transmitting unit 1120, and traffic-channel assignment unit 1130 may be coupled to a communication bus 1140. A processing unit 1150 and a memory unit 1160 may also be coupled to communication bus 1140. Processing unit 1150 may be configured to control and/or coordinate the operations of various units. Memory unit 1160 may embody instructions to be executed by processing unit 1150.

Various units/modules in FIGS. 10-11 and other embodiments may be implemented in hardware, software, firmware, or a combination thereof. In a hardware implementation, various units may be implemented within one or more application specific integrated circuits (ASIC), digital signal processors (DSP), digital signal processing devices (DSPDs), field programmable gate arrays (FPGA), processors, microprocessors, controllers, microcontrollers, programmable logic devices (PLD), other electronic units, or any combination thereof. In a software implementation, various units may be implemented with modules (e.g., procedures, functions, and so on) that perform the functions described herein. The software codes may be stored in a memory unit and executed by a processor (or processing unit). The memory unit may be implemented within the processor or external to the processor, in which case it can be communicatively coupled to the processor via various means known in the art.

Various disclosed embodiments may be implemented in an AN, an AT, and other elements in multi-carrier communication systems.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in an AT. In the alternative, the processor and the storage medium may reside as discrete components in an AT.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for wireless communications, comprising:
   receiving a plurality of pilot signals associated with a sector, each pilot signal having a group identifier,
   wherein the group identifier is assigned to each pilot signal based on the coverage area of the pilot signal such that pilot signals having comparable coverage areas are assigned the same group identifier;
   grouping the pilot signals into one or more pilot groups in accordance with the group identifiers of the pilot signals; and
   selecting one of the received plurality of pilot signals as a representative pilot signal for each pilot group of pilot signals for pilot strength reporting, wherein the pilot signals in each pilot group are characterized by distinct frequencies in a multi-carrier communication system.

2. The method of claim 1, further comprising measuring a strength of the representative pilot signal.

3. The method of claim 2, further comprising reporting the strength of the representative pilot signal to an access network, if the strength of the representative pilot signal exceeds a predetermined threshold.

4. The method of claim 2, further comprising reporting the strength of the representative pilot signal to an access network, if the strength of the representative pilot signal falls below a predetermined threshold.

5. The method of claim 1, wherein the group identifier includes a PN offset.

6. The method for wireless communications of claim 1 wherein the pilot signals with substantially the same coverage area are assigned a common group identifier,
   further comprising transmitting each pilot signal with the group identifier.

7. The method of claim 6, wherein the group identifier includes a PN offset.

8. The method of claim 1, wherein the coverage area of a pilot signal is based on a strength versus distance profile of the pilot signal.

9. A method for wireless communications, comprising:
   selecting a pilot signal from a plurality of pilot signals having a common group identifier, the pilot signals associated with a neighbor sector,
   wherein the common group identifier is assigned to each pilot signal based on the coverage area of the pilot signal such that pilot signals having comparable coverage areas are assigned the same group identifier, and
   the coverage area of a pilot signal is based on a strength versus distance profile of the pilot signal; and
   broadcasting the selected pilot signal.

10. An apparatus adapted for wireless communications, comprising a processor configured to:
    receive a plurality of pilot signals associated with a sector, each pilot signal having a group identifier,
    wherein the group identifier is assigned to each pilot signal based on the coverage area of the pilot signal such that pilot signals having comparable coverage areas are assigned the same group identifier;
    group the pilot signals into one or more pilot groups in accordance with the group identifiers of the pilot signals; and
    select one of the received plurality of pilot signals as a representative pilot signal for each pilot group of pilot signals for pilot strength reporting, wherein the pilot signals in each pilot group are characterized by distinct frequencies in a multi-carrier communication system.

11. The apparatus of claim 10, wherein the group identifier includes a PN offset.

12. The apparatus of claim 10, wherein the processor is further configured to measure a strength of the representative pilot signal.

13. The apparatus adapted for wireless communications of claim 10,
    wherein the pilot signals with substantially the same coverage area are assigned a common group identifier,
    said processor is configured to transmit each pilot signal with the group identifier.

14. The apparatus of claim 10, wherein the coverage area of a pilot signal is based on a strength versus distance profile of the pilot signal.

15. An apparatus adapted for wireless communications, comprising: a receiver configured to receive a plurality of pilot signals associated with a sector, each pilot signal having a group identifier, wherein the group identifier is assigned to each pilot signal based on the coverage area of the pilot signal such that pilot signals having comparable coverage areas are assigned the same group identifier; a grouping unit configured to group the pilot signals into one or more pilot groups in accordance with the group identifiers of the pilot signals; and a selecting unit configured to select one of the received plurality of pilot signals as a representative, e pilot signal for each pilot group of pilot signals for pilot strength reporting, wherein the pilot signals in each pilot group are characterized by distinct frequencies in a multi-carrier communication system.

16. A non-transitory computer-readable storage medium embodying executable instructions, the instructions comprising:
    code for receiving a plurality of pilot signals associated with a sector, each pilot signal having a group identifier, wherein the coverage area of a pilot signal is based on a strength versus distance profile of the pilot signal;

code for grouping the pilot signals into one or more pilot groups in accordance with the group identifiers of the pilot signals, code for selecting a representative pilot signal for each pilot group of pilot signals for pilot strength reporting, wherein the pilot signals in each pilot group are characterized by distinct frequencies in a multi-carrier communication system.

17. The non-transitory computer-readable storage medium of claim 16,
wherein the pilot signals with substantially the same coverage area are assigned a common group identifier; and further comprising code for transmitting each pilot signal with the group identifier.

18. The non-transitory computer-readable storage medium of claim 16, further comprising:
code for measuring a strength of the representative pilot signal; and
code for reporting the strength of the representative pilot signal to an access network.

19. A non-transitory computer-readable storage medium embodying executable instructions, the instructions comprising:
code for selecting a pilot signal from a plurality of pilot signals having a common group identifier, the pilot signals associated with a neighbor sector,
wherein the common group identifier is assigned to each pilot signal based on the coverage area of the pilot signal such that pilot signals having comparable coverage areas are assigned the same group identifier, and
the coverage area of a pilot signal is based on a strength versus distance profile of the pilot signal; and
code for broadcasting the selected pilot signal.

20. The apparatus of claim 15, wherein the coverage area of a pilot signal is based on a strenght versus distance profile of the pilot signal.

21. An apparatus adapted for wireless communications, comprising: a group-ID assigning unit configured to assign a group identifier to each of a plurality of pilot signals associated with a sector, the assigning based on a coverage area of each pilot signal,
where each pilot signal with substantially the same coverage area is assigned a common group identifier, wherein the coverage area of a pilot signal is based on a strength versus distance profile of the pilot signal;
and a transmitter configured to transmit each pilot signal with the group identifier.

22. An apparatus adapted for wireless communications, comprising a processor configured to:
select a pilot signal from a plurality of pilot signals having a common group identifier, the pilot signals associated with a neighbor sector,
wherein the common group identifier is assigned to each pilot signal based on the coverage area of the pilot signal such that pilot signals having comparable coverage areas are assigned the same group identifier, and the coverage area of a pilot signal is based on a strength versus distance profile of the pilot signal; and
broadcasting the selected pilot signal.

23. A non-transitory computer-readable storage medium embodying executable instructions, the instructions comprising:
code for receiving a plurality of pilot signals associated with a sector, each pilot signal having a group identifier, wherein the coverage area of a pilot signal is based on a strength versus distance profile of the pilot signal;

code for grouping the pilot signals into one or more pilot groups in accordance with the group identifiers of the pilot signals, code for selecting a representative pilot signal for each pilot group of pilot signals for pilot strength reporting, wherein the pilot signals in each pilot group are characterized by distinct frequencies in a multi-carrier communication system.

24. The non-transitory computer-readable storage medium of claim 23, wherein the pilot signals with substantially the same coverage area assigned a common group identifier; and
further comprising code for transmitting each pilot signal with the group identifier.

25. The non-transitory computer-readable storage medium of claim 23, further comprising:
code for measuring a strength of the representative pilot signal; and
code for reporting the strength of the representative pilot signal to an access network.

26. A non-transitory computer-readable storage medium embodying executable instructions, the instructions comprising:
code for selecting a pilot signal from a plurality of pilot signals having a common group identifier, the pilot signals associated with a neighbor sector,
wherein the common group identifier is assigned to each pilot signal based on the coverage area of the pilot signal such that pilot signals having comparable coverage areas are assigned the same group identifier, and
the coverage area of a pilot signal is based on a strength versus distance profile of the pilot signal; and
code for broadcasting the selected pilot signal.

27. An apparatus adapted for wireless communication, the apparatus comprising:
means for receiving a plurality of pilot signals associated with a sector, each pilot signal having a group identifier,
wherein the coverage area of a pilot signal is based on a strength versus distance profile of the pilot signal;
means for grouping the pilot signals into one or more pilot groups in accordance with the group identifiers of the pilot signals,
means for selecting a representative pilot signal for each pilot group of pilot signals for pilot strength reporting, wherein the pilot signals in each pilot group are characterized by distinct frequencies in a multi-carrier communication system.

28. The apparatus of 27, wherein the pilot signals with substantially the same coverage area are assigned a common group identifier; and further comprising means for transmitting each pilot signal with the group identifier.

29. The apparatus of claim 28, further comprising:
means for measuring a strength of the representative pilot signal; and
means for reporting the strength of the representative pilot signal to an access network.

30. An apparatus adapted for wireless communication, the apparatus comprising:
means for selecting a pilot signal from a plurality of pilot signals having a common group identifier, the pilot signals associated with a neighbor sector,
wherein the common group identifier is assigned to each pilot signal based on the coverage area of the pilot signal such that pilot signals having comparable coverage areas are assigned the same group identifier, and
the coverage area of a pilot signal is based on a strength versus distance profile of the pilot signal; and
means for broadcasting the selected pilot signal.

* * * * *